UNITED STATES PATENT OFFICE.

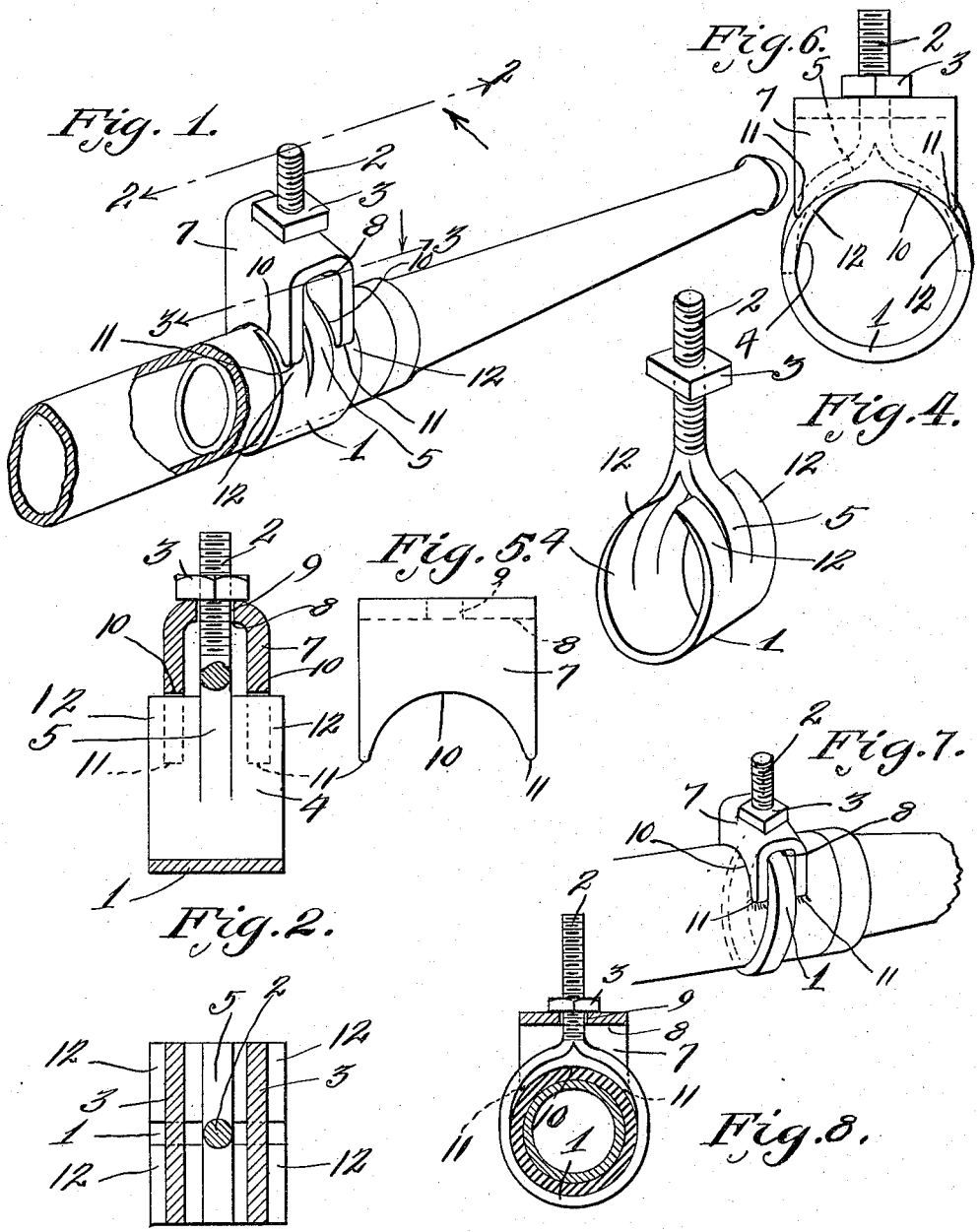

ADAMS MURPHEY McDONALD, OF DAVIS, WEST VIRGINIA.

HOSE-CLAMP.

1,170,921. Specification of Letters Patent. Patented Feb. 8, 1916.

Application filed November 10, 1914. Serial No. 871,300.

*To all whom it may concern:*

Be it known that I, ADAMS MURPHEY MCDONALD, a citizen of the United States, residing at Davis, in the county of Tucker and State of West Virginia, have invented a new and useful Hose-Clamp; and I do hereby declare the following to be a full, clear, and exact description of the invention, such as will enable others skilled in the art to which it appertains to make and use the same.

This invention relates to a useful improved hose clamp.

It is the aim to provide a clamp of this character for clamping different sized hose, and to hold the hose smoothly and neatly clamped, in order to prevent bulging of the same at the junction where the clamp fits.

In practical fields the details of construction may necessitate alterations, falling within the scope of what is claimed.

The invention comprises further features and combination of parts, as hereinafter set forth, shown in the drawings and claimed.

In the drawings:—Figure 1 is a perspective of the improved clamp as applied to a hose. Fig. 2 is a longitudinal sectional view on line 2—2 of Fig. 1. Fig. 3 is a transverse sectional view on line 3—3 of Fig. 1. Fig. 4 is a detail perspective view of the clamping ring and the screw threaded shank. Fig. 5 is a detail view of the U-shaped clamp. Fig. 6 is a view in elevation of the ring clamp and the U-shaped clamp shown in Fig. 1. Fig. 7 is a perspective view showing another form of the hose clamp. Fig. 8 is a sectional view through the form of hose clamp shown in Fig. 7.

Referring to the drawings 1 designates the substantially ring shaped clamping member, which is provided with a laterally extending screw 2 having a nut 3. One half, which is designated by the numeral 4, of the ring clamp is semi-cylindrical, the other half 5 is substantially elliptical as shown. A U-shaped clamp 7 is provided, in the curved arch 8 of which an aperture 9 is constructed, through which the screw passes, when the U-shaped clamp arches the ring clamp. The U-shaped clamp is provided with segmental curved edges 10, which merge into round corners 11 at the ends of said U-shaped clamp.

In Figs. 7 and 8 the segmental curved edges contact for their full length with the hose, thereby clamping the hose upon one side tightly against the nozzle or other connection, the ring clamp acting to tightly clamp the other side of the hose.

In Figs. 1 to 6 inclusive it is apparent that the ring clamp is provided with oppositely arranged spring arms 12, which are split from the ring as shown, and are designed to ride against the segmental curved edges of the U-shaped clamp. The free ends of said arms are tapered in their thickness so that the hose will neatly fit in contact with the arms and a portion of each segmental curved part. Said spring arms also act to prevent the hose from bulging adjacent the round corners of the U-shaped clamp, which bulging is shown in Fig. 7.

From the foregoing it will be noted there has been devised a simple and improved hose clamp, adapted for making various kinds of hose connections.

The nut 3 acts to clamp the U-shaped member in place.

The invention having been set forth, what is claimed as new and useful is:—

A hose clamp comprising a ring clamping member having a laterally extending screw, the lower half of the ring clamping member opposite the screw being semi-circular, the other half adjacent the screw being partially elongated or semi-elliptical, a U-shaped clamping member having an aperture in the arch thereof to receive the screw, said U-shaped clamping member arching the semi-elliptical portion of the ring, the semi-circular portion of the ring having oppositely arranged spring arms, said U-shaped clamp having its side portions provided with segmental curved edges to engage the oppositely arranged spring arms to press them in engagement with the hose, which passes through the ring clamp.

In testimony whereof I have signed my name to this specification in the presence of two subscribing witnesses.

ADAMS MURPHEY McDONALD.

Witnesses:
E. S. ARMSEY,
N. L. WILSON.

Copies of this patent may be obtained for five cents each, by addressing the "Commissioner of Patents, Washington, D. C."